United States Patent
Vohmann et al.

(10) Patent No.: US 6,454,067 B1
(45) Date of Patent: Sep. 24, 2002

(54) METHOD AND DEVICE FOR CONTROLLING AND REGULATING A COUPLING

(75) Inventors: Martin Vohmann, Esslingen; Ralf Dreibholz, Meckenbeuren; Joachim Foth, Wangen, all of (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/786,218
(22) PCT Filed: Aug. 10, 1999
(86) PCT No.: PCT/EP99/05784
§ 371 (c)(1), (2), (4) Date: Apr. 13, 2001
(87) PCT Pub. No.: WO00/14434
PCT Pub. Date: Mar. 16, 2000

(30) Foreign Application Priority Data

Sep. 5, 1998 (DE) .......................................... 198 40 572

(51) Int. Cl.[7] .......................... F16H 61/02; F16D 48/06
(52) U.S. Cl. ...................... 192/3.63; 192/3.55; 192/3.61
(58) Field of Search ............................... 192/3.63, 3.61, 192/3.62, 3.55, 3.56, 3.58

(56) References Cited

U.S. PATENT DOCUMENTS 4,805,750 A * 2/1989 Nitz ....................... 192/103 F

FOREIGN PATENT DOCUMENTS

DE 39 35 438 A * 5/1991

* cited by examiner

Primary Examiner—Saúl J. Rodriguez
(74) Attorney, Agent, or Firm—Davis & Bujold, P.L.L.C.

(57) ABSTRACT

A method and device for a coupling (2) in a motor vehicle, transmission (1) are proposed in which the coupling is controlled and regulated during three operational states via a first regulating circuit (3). The regulated quantity corresponds to the actual value of a differential rotational speed of the coupling (2). The first state corresponds to a starting operation, the second state to the operation with constant ratio and the third state exists when a gear shift under load or a change of ratio from a first to a second ratio step of an automatic transmission (1) is initiated.

21 Claims, 4 Drawing Sheets

METHOD AND DEVICE FOR CONTROLLING AND REGULATING A COUPLING

FIELD OF THE INVENTION

The invention relates to a method and a device for controlling and regulating a coupling of a motor vehicle transmission in which an electronic control unit determines the behavior of the coupling by means of a regulating circuit.

BACKGROUND OF THE INVENTION

In the sense of the invention, by coupling a starting clutch is to be understood. Under the designation fall clutches mounted between an internal combustion engine and an automatic transmission, lock-up clutches and also clutches integrated in the automatic transmission which can be used both to start and as a selector clutch.

A method for controlling a starting clutch has been disclosed, e.g. in DE 44 09 122 A1. Here the starting control comprises two phases. In a first phase, the input rotational speed of the clutch is brought to a theoretical rotational speed, wherein the theoretical rotational speed is established from the drivers performance standard or the gradient and a driving activity. In the second phase, the difference between the input and the output rotational speeds of the clutch is reduced to zero according to a theoretical value curve. DE 39 37 976 A1 disclosed a method for regulating the clutch which serves to neutralize vibration. The slip of the clutch is modified, according to a revolution uniformity determined on the transmission output. From EP 0 214 989 B2, in turn, is known the use of a clutch integrated in the automatic transmission as a starting element. Departing from the above described prior art, the problem on which the invention is based is to develop it with regard to the multiple utilization of a single coupling in combination with an automatic transmission.

SUMMARY OF THE INVENTION

According to the invention, the problem is solved by the objects of the independent claims. It is advantageous that a single regulating circuit is exclusively used for control and regulation of the coupling during three operation states. The regulated quantity corresponds to the actual value of the differential rotational speed of the coupling. The three operational states correspond to a starting operation as a first state, to the driving with constant ratio as a second state, and to a third state which exists when either a gear shift under load or a change of ratio from a first to a second step ratio of an automatic transmission is initiated, the first gear shift under load being advantageously used in an automatically power shiftable stepped transmission and the change or ratio in an automatic stepped transmission with traction interruption when gear shifting for a motor vehicle.

In the case of an overlapping gear shift for a gear shift under load, an adequate regulating circuit, hereinafter designated as second regulating circuit, determines the behavior of the engaging and disengaging couplings. Such a method is known, e.g. from DE 44 24 456 A1. During the gear shift under load, the coupling is influenced as a result of the rotatory masses to be retarded or accelerated. For this case, that is, the third state, it is proposed, according to claim 2, that the first and second regulating circuits are interconnected, via an uncoupling network, wherein the uncoupling network has first and second signal paths. As states in claim 4, the second acts upon the first regulating circuit during the gear shift under load exclusively during phase load take up, gradient breakdown and closing. Thus, the advantage obtained by the uncoupling network is that the two controllers do not oppositely influence each other during operation.

For all three states, the theoretical value of the differential rotational speed of the coupling is determined from the addition of a theoretical value offset and a gear-dependent differential rotational speed of the coupling. According to claim 3, the gear-dependent differential rotational speed is determined for a starting gear of the automatic transmission via a first characteristic field. The gear-dependent differential rotational speed for non-starting gears, such as the fifth gear of the automatic transmission, is determined via second characteristic fields, as described in claim 14. Both the first and the second characteristic fields each show a coordination of performance standard of the driver and the output rotational speed of the coupling. The reversal between the first and the second characteristic fields occurs during the gear shift under load of the automatic transmission. The second characteristic fields are, according to claim 17, configured so that an increased theoretical value of the rotational speed difference results at a vehicle speed lower than a limit value. An active protection against stalling for non-starting gears, that is, the fourth and fifth gears, for example, hereby is attained.

BRIEF DESCRIPTION OF THE DRAWING(S)

The invention is explained below with reference to the embodiments for a gear shift under load shown in the drawings. In the drawings.

DETAILED DESCRIPTION OF THE INVENTION

Figure 1:
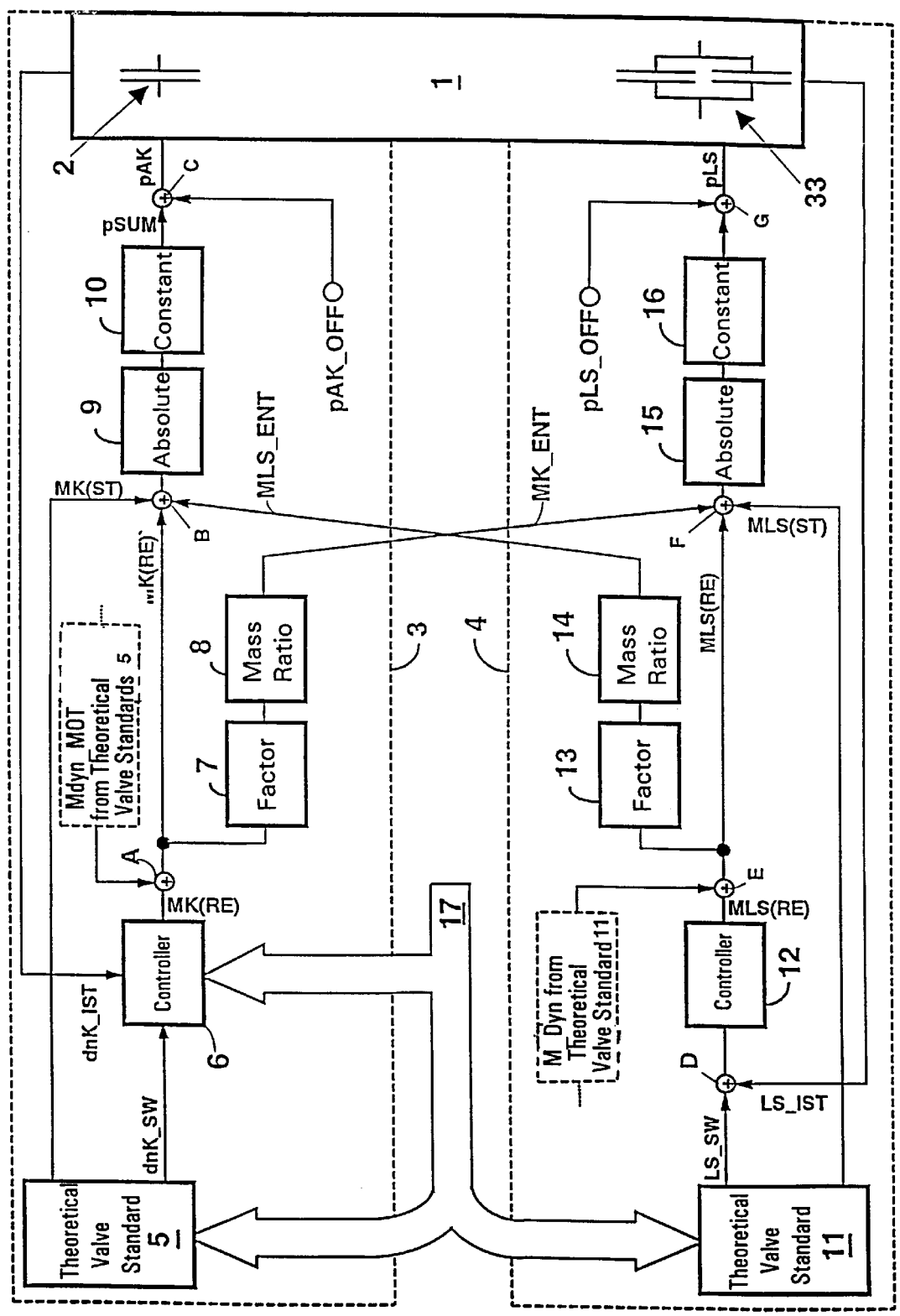
FIG. 1 shows a summary of the first and second regulating circuits.

FIG. 1 shows a summary of the two regulating circuits. The first regulating circuit for control and regulation of the coupling 2 is designated with reference numeral 3. The second regulating circuit for control and regulation of the gear shift under load of an automatic transmission 1 is designated with reference numeral 4. In the sense of the invention, by a gear shift under load is to be understood an overlapping gear shift. As known already, during the overlapping gear shift, a first coupling opens while a second coupling closes. In FIG. 1, both couplings are shown by the reference numeral 33. Such a method is known from DE 44 24 456 A1 which disclosure is included in the content of this application. In accordance with the invention, a coupling 2 is to be understood as a starting coupling. This can be front mounted on the automatic transmission 1 or correspond to the lock-up coupling or a coupling integrated in the transmission. Input variables 17 are fed to both the first and the second regulating circuits 3, 4. Input variables 17 are: the signal of the driver's performance standard, e.g. throttle valve information DKI or the gradient thereof, the torque of an internal combustion engine (not shown), which drives the automatic transmission 1 and the input/output rotational speed of the coupling 2. The first regulating circuit 3 consists of the blocks: theoretical value standard 5, controller 6, factor 7, mass ratio 8, absolute value 9 and constant 10. The theoretical value standard 4 delivers, as output variables, the theoretical value of the differential rotational speed dnK__SW coupling 2 and the controlled torque MK(ST) of the coupling 2, the same as the dynamic engine torque MDYN__MOT. The inner structure of the theoretical value standard 5 is explained with reference to FIG. 2. To the controller 6 are the input variables 17, the theoretical value dnK__SW of the differential rotational speed of the coupling 2, the same as the actual value dnK__IST of the differential rotational speed of the coupling 2. The inner structure of the controller 6 is explained with reference to FIG. 3. An output variable of the controller 6 is the regulated torque MK(RE) of the coupling 2. The regulated summation torque MK(RE)' results from the regulated torque MK(RE) of the coupling 2 and the dynamic engine torque MDYN__MOT at summation point A. This is summed at point B, with the controlled torque MK(ST) of the coupling 2 generated from the theoretical value standard 5 and the uncoupling torque of the gear shift under load MLS__ENT. The absolute value is formed from this sum by means of the function block 9 and the result is weighted with a constant, at function block 10. The output variable is a summed up pressure pSUM. A pressure offset pAK__OFF is superposed at summation point C with this summed up pressure PSUM. The pressure level pAK resulting herefrom is the pressure level acting upon the coupling 2.

The second regulating circuit 4 consists of: theoretical value standard 11, controller 12, factor 13, mass ratio 14, absolute value 15 and constant 16. The second regulating circuit 4 determines the course of the gear shift under load. A gear shift under load, that is, a gear shift from a first to a second step ratio, consists for a traction upshift of the following sections: rapid filling, filling equalizing, load take up, gradient adjustment, sliding, gradient breakdown and closing phases. From the input variables 17, the function block theoretical value standard 11 determines the theoretical value LS__SW of the gear shift under load, the controlled torque MLS(ST) of the gear shift under load and the dynamic torque M__DYN. The theoretical value LS__SW is compared, at summation point D, with the actual value LS__IST of the gear shift under load. The actual value LS__IST is determined from output variables of the automatic transmission 1. The resulting deviation is the input variable of the controller 12. The controller output value corresponding to the regulated torque MLS(RE) of the gear shift under load is added, at summation point E, to the dynamic torque M__DYN from the theoretical value standard 11. Herefrom results the regulated summed up torque MLS(RE)' of the gear shift under load. This is added, at summation point F, to the controlled torque MLS(ST) of the gear shift under load and to the uncoupling torque of the clutch MK__ENT. The absolute value is formed from the result by means of the function block 15. The result is then weighted with a constant in function block 16. The output variable is loaded, at summation point G, with an offset pLS__OFF. The result is the pressure value pLS for the coupling 33 to be engaged during the overlapping gear shift.

The first and second regulating circuits 3, 4 are interconnected via an uncoupling network. The uncoupling network contains a first signal path in which function block 7 and function block 8 are situated. The input variable of the first signal path is the regulated summed up torque MK(RE)'. This is multiplied by a factor, function block 7. The factor is coordinated on the basis of tests. The result is weighted in function block 8 with the mass ratio of the engine-mass to the sum of engine-mass and transmission mass. The output variable is then the uncoupling torque MK__ENT of the coupling 2. The second signal path of the uncoupling network is contained in function blocks 13 and 14, the input variable of which is the regulated summation torque MLS(RE)' of the gear shift under load. The output variable of the second signal path is the uncoupling torque of the gear shift under load MLS__ENT.

Figure 2:
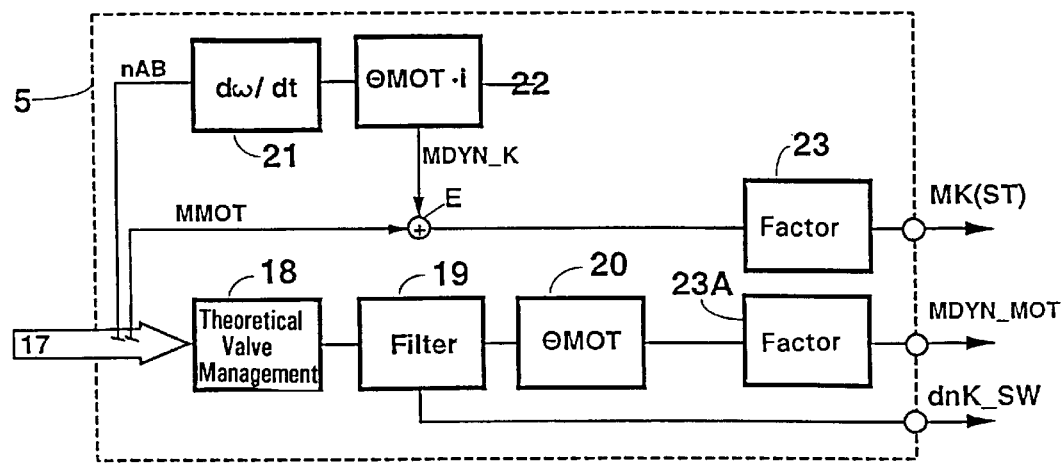
FIG. 2 shows a function block theoretical value standard.

In FIG. 2, the inner structure of the theoretical value standard 5 is shown. To it are fed the input variables 17. In function block 18, theoretical value management, a rough theoretical value of the differential rotational speed of the coupling 2, is determined from the input variables of rotational speed of the internal combustion engine and throttle valve information DKI and torque of the internal combustion engine. The value is then filtered in the filter 19 usually designed as PT1 element with a gradient limitation. One output variable of the filter 19 is the theoretical value dnK__SW of the differential rotational speed of the coupling 2. The theoretical value is made available at the output of the theoretical value standard 5. One other output variable of the filter 19 is linked to the function block 20 with the engine inertia torque Theta-MOT and one factor, reference numeral 23A. The output variable is then the dynamic torque of the internal combustion engine MDYN__MOT. The angular speed gradient dOmega/dt is determined by means of the function block 21 from the input variable output rotational speed of the coupling nAB. The result is multiplied, in function block 22, by the engine inertia torque Theta-MOT and the actual ratio of the automatic transmission 1. The output variable is the dynamic torque MDYN__K on the coupling 2 during gear shift under load. The following equation applies here:

in the gradient adjustment phase:

MDYN__K=Theta__MOT.i1.dOmega/dt;

or in the sliding phase:

MDYN__K=Theta__MOT.i2.dOmega/dt;

MDYN__K: dynamic torque clutch;
Theta__MOT: inertia torque internal combustion engine;
i1: first step ratio;
i2: second step ratio;
dOmega/dt: gradient angular speed coupling.

At summation point E, the dynamic torque of the coupling 2 is then linked with the torque MMOT generated by the internal combustion engine. The result is added, at summation point F, to the previously calculated dynamic torque of the internal combustion engine MDYN__MOT. The result is weighted, in function block 23, with an adjustable factor the output variable of which is the controlled torque MK(ST) of the coupling 2.

Figure 3:
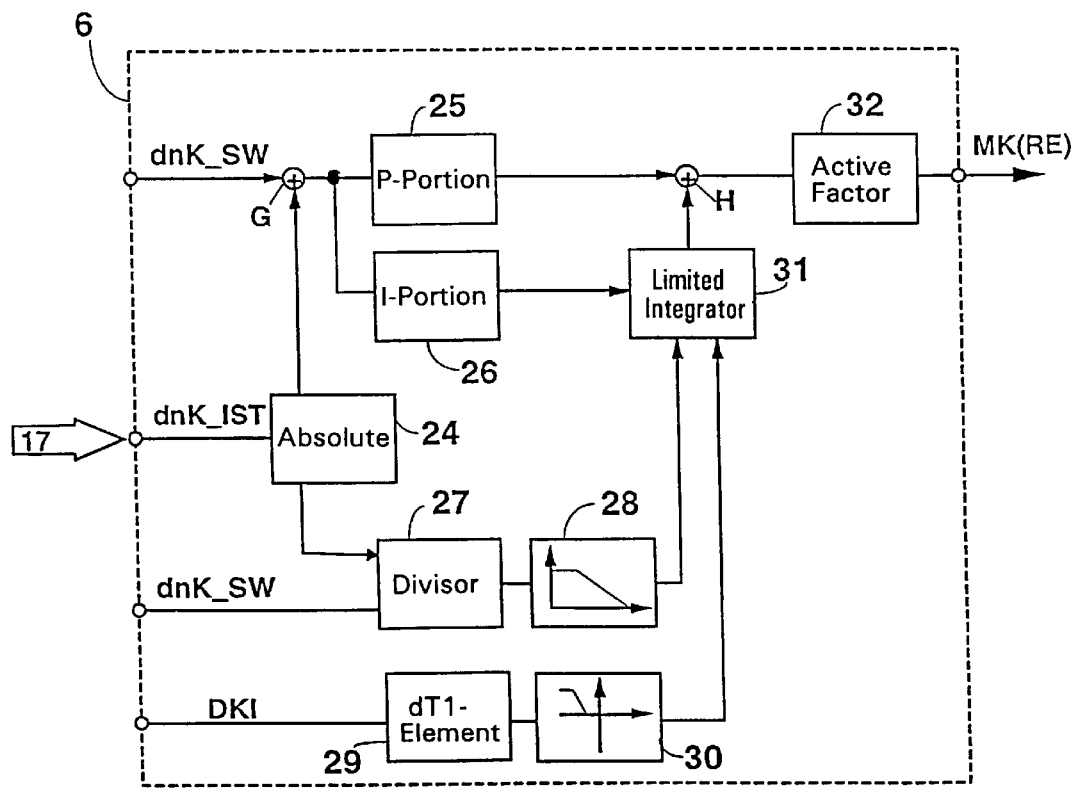
FIG. 3 shows a function block controller.

In FIG. 3, the inner structure of the controller 6 is shown. To it are fed the input variable 17, the same as the theoretical value dnK__SW and the actual value dnK__IST of the differential rotational speed of the coupling 2. The absolute value is formed from the actual value dnK__IST in function block 24. The absolute value is then the input variable for the divisor 27 or to summation point G. The theoretical value dnK_SW of the differential rotational speed of the coupling 2 is passed to the divisor 27 as a second input variable. The quotient is passed to function block 28, a characteristic line for the dynamic lowering. Via the characteristic line, with very low slip values such as less than 10 revolutions, the input value of the integrator, reference numeral 31, is artificially increased. Hereby is achieved an additional ramp-like pressure reduction. A zero point results from the ratio of the actual to theoretical value of the rotational speed difference of the coupling 2. The input variable throttle valve information DKI is the input signal for a dT1 element, reference numeral 29. The output signal of this filter is then the input signal for the characteristic line "quick opening", reference numeral 30. Via the characteristic line, depending on the driver's performance standard or the gradient thereof, the input value of the integrator 31 is artificially increased during quick gas re-utilization. An additional ramp-like pressure reduction results. The pressure reduction is changeable over the characteristic line. At summation point G, the theoretical value dnK_SW is summed up with the absolute value of the differential rotational speed coupling 2 formed in the function block 24. The result is then passed parallel, on one hand, via a function block P-portion, reference numeral 25, and, on the other via an I-portion, reference numeral 26. The output variable of the P-portion, reference numeral 25, acts upon summation point H. The output variable of the function block 26 acts upon the limited integrator, reference numeral 31. The output value of the limited integrator 31 is linked to summation point H with the proportional component from the function block 25 and passed to an active factor function block 32. Via the active factor in what direction the actual regulating torque must act is determined. This is necessary to determine the uncoupling torque MK_ENT.

Figure 4:
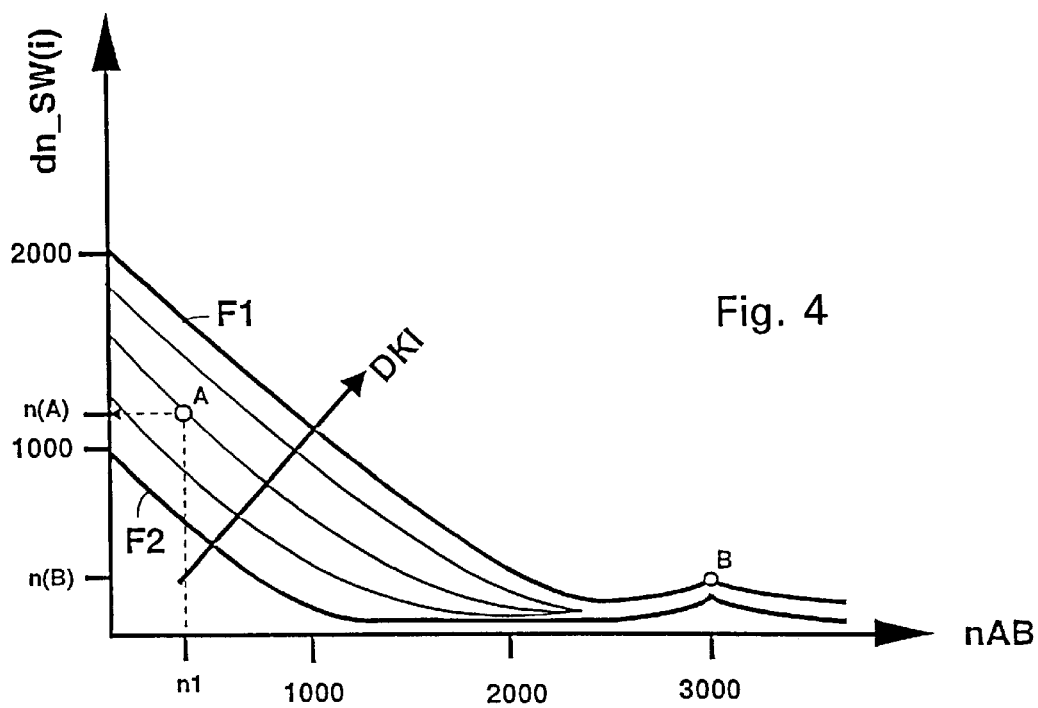
FIG. 4 shows a first characteristic field for starting gears.

FIG. 4 shows a first characteristic field KF1(i) of the automatic transmission 1. The characteristic field is used for starting gears, that is, the first (i=1) or the second (i=2) gear, for example. By means of the characteristic field KF1(i), a gear-dependent differential rotational speed dn_SWK(i) is determined. The input variables of the first characteristic field are the output rotational speed nAB of the coupling 2 and the throttle valve information DKI. Within the characteristic field, a range defined by the two limiting lines F1 and F2 is shown. The limiting line F2 corresponds to the throttle valve value 0%. The limiting line F1 corresponds to the throttle value 100%. Within the range is shown an assemblage of characteristic lines of several throttle valve values. The sequence of the method is as follows: from the actual output rotational speed nAB of the coupling 2, the value n1, and the actual throttle value, such as 50%, results in operating point A. From this, in turn, results the gear-dependent differential rotational speed value nA. In addition in FIG. 4, a rotational speed overshoot, point B, is plotted at an output rotational speed of 3000 revolutions. A neutralization of vibrations between internal combustion engine and output of the automatic transmission 1 is obtained via the rotational speed overshoot n(B). The position of point B or value n(B) depends on the internal combustion engine used and is defined in the adaptation phase of the automatic transmission.

Figure 5:
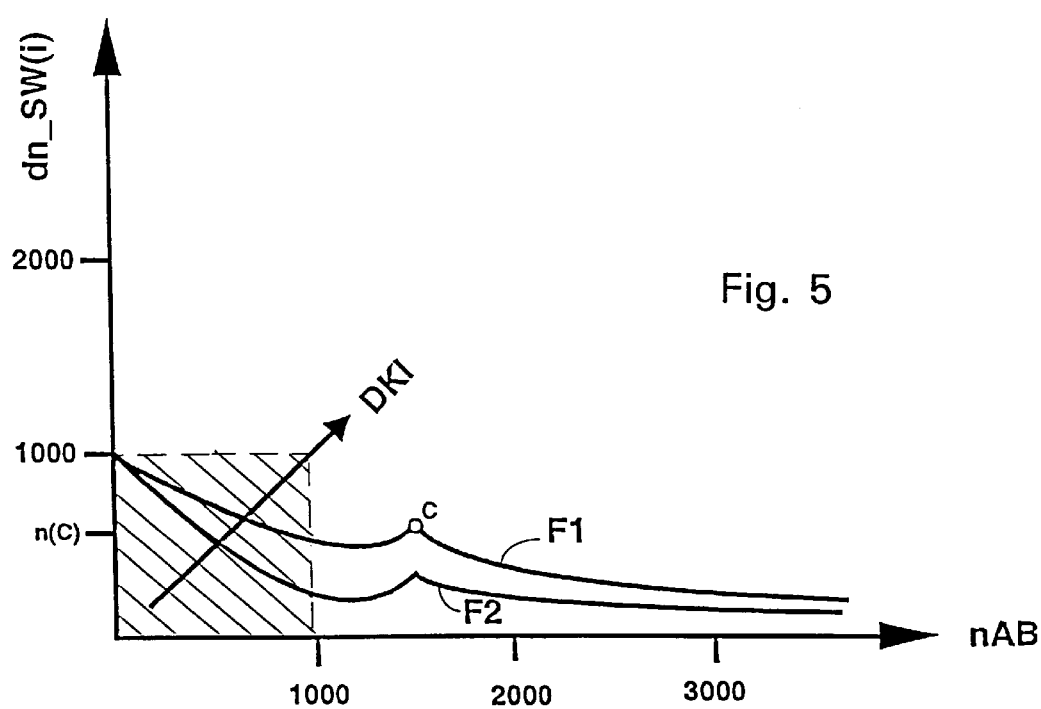
FIG. 5 shows a second characteristic field for non-starting gears.

In FIG. 5, a second gear-dependent characteristic field KF2(i) is shown. Via the second characteristic field KF2(i), the differential rotational speed dn_SW(i) for non-starting gears, that is, the fifth gear of the automatic transmission, for example, is determined. The input and output variables correspond to those of the first characteristic field. Likewise, the characteristic field contains a range defined by the two limiting characteristic lines F1 and F2. The limiting line F2 corresponds to 0% and the limiting line F1 to 100% throttle valve information DKI. Point C is plotted on the limiting line F. The rotational speed overshoot value n(c) causes the coupling to be kept in a slipping state so that an active neutralization of vibrations is achieved. A shaded range is shown within the characteristic field. The range serves for protection against stalling, that is, at low output rotational speeds nAB of the coupling 2, this is loaded with a defined theoretical value of the differential rotational speed. The protection against stalling can also be calculated according to the following equation:

$$dnK\_SW(i) > NMOT\_MIN - nAB$$

NMOT_MIN: minimum rotational speed of the internal combustion engine; and nAB: output rotational speed of the coupling 2.

The first characteristic field KF1(i) with 1=1 or 2 is used for a starting gear, that is, the first (i=1), for example. The second characteristic field KF2(i), i=3 to n, is used for non-starting gears, that is, the fifth (i=5), for example. For each gear, one specific characteristic field exists. The transition from first KF1(i) to a second KF2(i) characteristic field occurs during the gear shift under load of the automatic transmission 2. This means that the curve of the characteristic lines, according to the first characteristic field KF1(i) of FIG. 4, is approximated via intermediate characteristic fields to a curve according to FIG. 5. The intermediate characteristic fields, that is, corresponding to the third or fourth gear, for example, are not shown.

Figure 6:
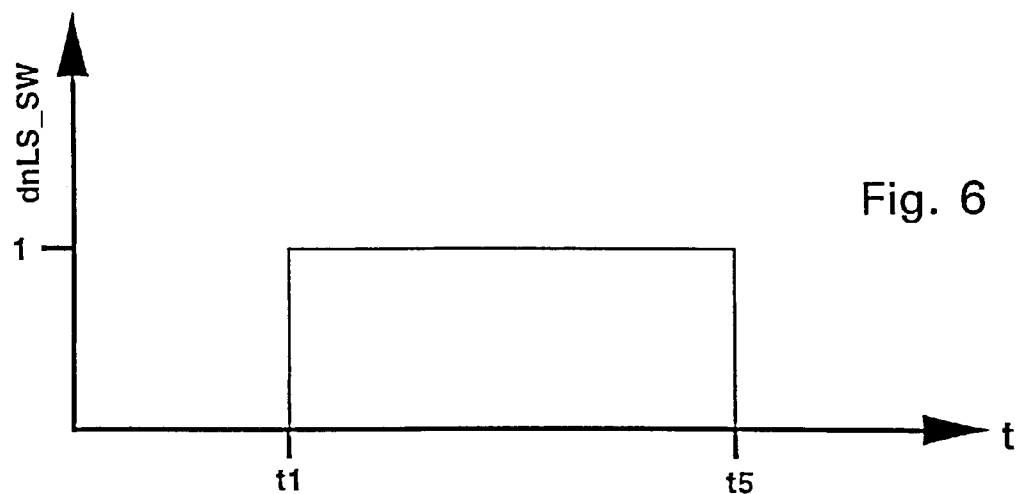
FIG. 6 shows theoretical value of differential rotational speed of gear shift under load in the course of time.
Figure 7:
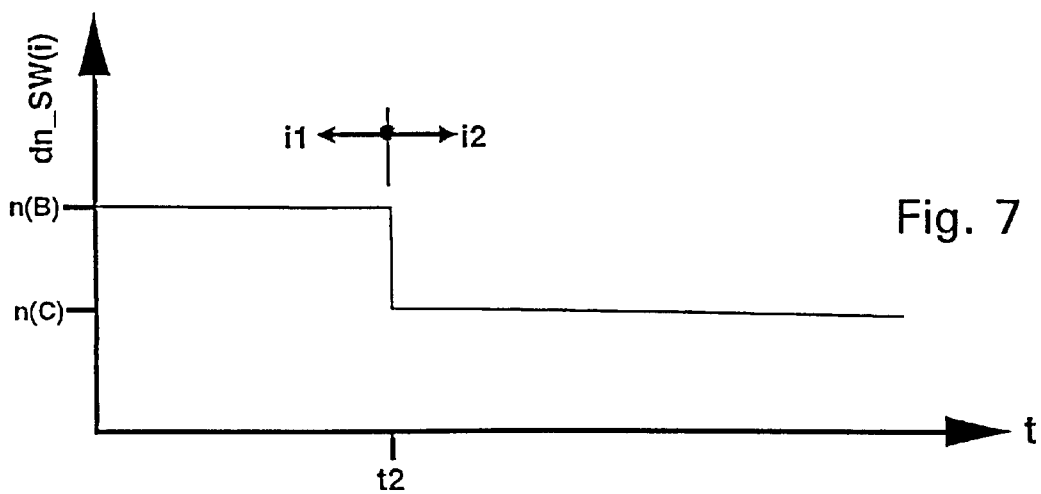
FIG. 7 shows theoretical value of differential rotational speed gear dependent in the course of time.
Figure 8:
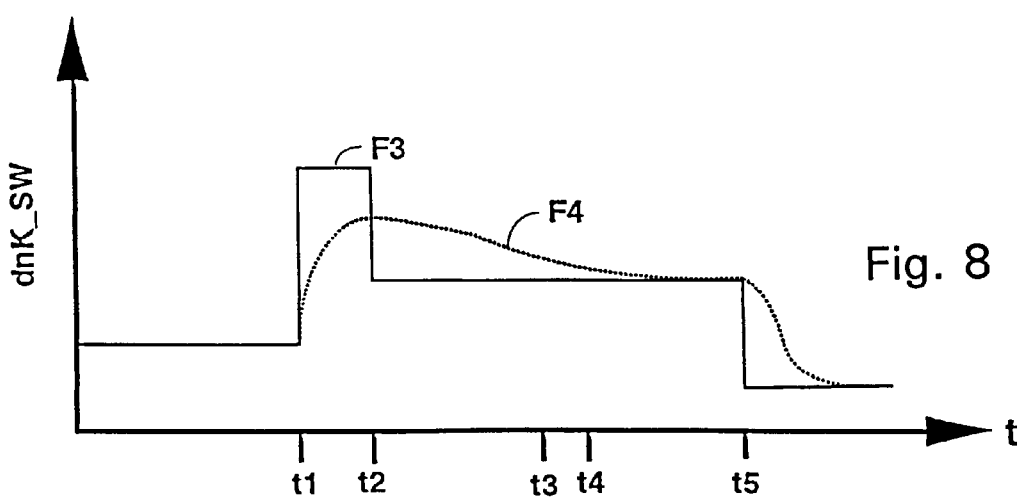
FIG. 8 shows theoretical value of differential rotational speed for the clutch in the course of time.

FIGS. 6 to 8 each show over the course of time: the theoretical value offset dnLS_SW, the gear-dependent differential value dn_SW(i) and the theoretical value of the differential rotational speed dnK_SW of the coupling 2. The time curves are shown for the third state, that is, during a gear shift under load from a first to a second step ratio of the automatic transmission. It is assumed that what is involved is a gear shift under load from a starting gear to a non-starting gear. In FIG. 7 two rotational speed values n(B) and n(C) are plotted on the ordinate. These two rotational speed values are respectively determined according to the first characteristic field KF1(i) of FIG. 4 and the second characteristic field KF2(i) of FIG. 5. The reversal from the rotational speed value n(B) to the rotational speed value n(C) occurs when changing the reduction ratio, designated in FIG. 7 with i1 and i2. In FIG. 8, a time curve F3 is drawn as a solid line. This curve corresponds to the output variable of the function block 18, theoretical value management, of FIG. 2. The theoretical value dnK_SW of the differential rotational speed of the coupling 2 obtained by means of the filter 19 from the curve F3 with reference numeral F4 is shown. The curve F3 results from the addition of the curves of FIGS. 6 and 7 at each moment. At moment t1, the theoretical value offset dnLS_SW is increased radically. The gear-dependent differential rotational speed dn_SW(i) at moment t1, radially increases the theoretical value to the differential rotational speed dnK_SW of the coupling 2. At moment t2, reversal from the first characteristic field KF1(i) to the second characteristic field KF2(i) is effected, and a new rotational speed value n(C) results herefrom. Moment t2 is equivalent to the end of the gradient adjustment phase and the beginning of the sliding phase. The sliding phase ends at the moment t3. During the time period from t3 to t4, the gradient breakdown phase occurs. During the time period from t4 to t5 the closing phase of the engaging coupling 33 occurs. At moment t5, the theoretical value offset is reduced to zero according to FIG. 6. According to FIG. 8, a reduction of the theoretical value of the differential rotational speed dnK_SW of the coupling 2 also results. In the first and second states, that is, respectively in the starting operation and driving with a constant ratio, the theoretical value of the differential theoretical speed dnK_SW of the coupling 2 corresponds to the gear-dependent differential rotational speed value dn_SW(i).

The sequence of the inventive method is as follows: in the first state, that is, during the starting operation, the gear-dependent differential rotational speed dn_SW(i) is determined by means of the first characteristic field KF1(i). This corresponds to the theoretical value of the differential rotational speed dnK_SW of the coupling 2, since the theoretical value offset dnLS_SW is zero. According to FIG. 4, with an increasing output rotational speed nAB of the coupling 2, the theoretical value is reduced. It is possible here, as shown in FIG. 4, to adjust a higher theoretical value for increasing the comfort in order to obtain neutralization of vibrations. If a gear shift under load is now initiated, according to FIG. 5, a change is effected from the first characteristic field KF1(i) to the second characteristic field KF2(i). Therefrom results a sequence according to FIGS. 6 to 8. During the gear shift under load, via the uncoupling network, an uncoupling torque MLS_ENT of the gear shift under load is added to the controlled MK(ST) and regulated MK(RE)' summation moment via the second signal path. An uncoupling torque MK_ENT of the coupling 2 is added to the engaging coupling, via the first signal path.

Reference Numerals

| | |
|---|---|
| 1 | automatic transmission |
| 2 | coupling |
| 3 | first regulating circuit |
| 4 | second regulating circuit |
| 5 | theoretical value standard |
| 6 | controller |
| 7 | factor |
| 8 | calculation block mass ratio |
| 9 | absolute value |
| 10 | constant |
| 11 | theoretical value standard |
| 12 | controller |
| 13 | factor |
| 14 | calculation block: mass ratio |
| 15 | absolute value |
| 16 | constant |
| 17 | input variable |
| 18 | theoretical value management |
| 19 | filter |
| 20 | inertia torque |
| 21 | calculation block: dOmega/dt |
| 22 | calculation block |
| 23 | factor |
| 23A | factor |
| 24 | absolute value |
| 25 | P-portion |
| 26 | I-portion |
| 27 | divisor |
| 28 | characteristic line dynamic lowering |
| 29 | dT1 element |
| 30 | characteristic line "quick opening" |
| 31 | limited integrator |
| 32 | active factor |
| 33 | engaging coupling during gear shift under load |
| dn_SW(i) | gear-dependent differential rotational speed |
| dnK_SW | theoretical value differential rotational speed coupling |
| dnK_IST | actual value differential rotational speed coupling |
| MK(ST) | controlled torque coupling |
| MK(RE) | regulated torque coupling |
| MK_ENT | uncoupling torque coupling |
| pAK_OFF | pressure offset starting coupling |
| pSUM | summed up pressure |
| pAK | pressure level coupling |
| MDYN_K | dynamic torque coupling |
| pLS_OFF | pressure offset gear shift under load |
| nAB | output rotational speed coupling |
| LS_SW | theoretical value gear shift under load |
| MLS_(ST) | controlled torque gear shift under load |
| MLS(RE) | regulated torque gear shift under load |
| MLS(RE)' | regulated summation torque gear shift under load |
| MLS_ENT | uncoupling torque gear shift under load |
| MMOT | engine torque |
| MDYN_MOT | dynamic engine torque |
| DKI | throttle valve information = load position |
| dnLS_SW | theoretical value offset |

What is claimed is:

1. A method for controlling and regulating a coupling (2) of a motor vehicle transmission in which an electronic control unit determines, via a first regulating circuit (3), a behavior of said coupling (2) during first, second and third operational states, wherein a regulated quantity is equivalent to a differential rotational speed (dnK_IST) of the coupling (2) and the first operational state corresponding to a starting operation, the second operational state corresponding to driving with a constant ratio (i=const) and the third operational state occurring upon initiation of a gear shift under load from a first step ratio e(i1) to a second step ratio (i2) of an automatic transmission (1), the method comprises the steps of:

determining a gear shift under load from the first step ratio (i1) to the second step ratio (i2) step of the automatic transmission (1) by a second regulating circuit (4), and interconnecting the first regulating circuit (3) with the second regulating circuit(4) by an uncoupling network (7, 8, 13, 14).

2. The method according to claim 1, further comprising the step of providing the uncoupling network with a first signal path (7 or 9) and a second signal path (13 or 14).

3. The method according to claim 2, further comprising the step of, during a gear shift under load from the first step ratio (i1) to the second step ratio (i2) of the automatic transmission (1), coupling the first regulating circuit (3) to act upon the second regulating circuit (4) via the first signal path (7 or 8) of said uncoupling network upon, and coupling the second regulating circuit (4) to act upon the first regulating circuit (3) via the second signal path (13, 14) of the uncoupling network.

4. The method according to claim 3, further comprising the step of, during a gear shift under load from the first step ratio (i1) to the second step ratio (i2) of the automatic transmission (1), coupling the second (4) regulating circuit to act exclusively upon the first regulating circuit (3) during a load take-up phase, a gradient adjustment phase, a sliding phase, a gradient breakdown phase and a closing phase.

5. The method according to claim 1, further comprising the step of determining a pressure level (pAK) of the coupling (2) from an offset value (pAK_OFF) and a summation value (pSUM) (pAK=pAk_OFF+pSUM), and determining a summation value (pSUM) from the balance of controlled summation torque (MK(ST) of the coupling (2), regulated summation torque (MK(RE)') of the coupling (2) and uncoupling powershift torque (MLS_ENT) (pSUM=f (MK(ST), MK(RE)', MLS_ENT)).

6. The method according to claim 5, further comprising the step of determining the controlled torque (MK(ST)) from the dynamic torque of the coupling (MDYN_K) and the engine torque (MMOT) (MK(ST)=f(MDYN_K, MMOT).

7. The method according to claim 5, further comprising the step of determining the regulated summation torque (MK(RE)') of the coupling (2) from a dynamic engine torque (MDYN_MOT) and a regulated torque (MK(RE)) of the coupling (2).

8. The method according to claim 5, further comprising the step of determining an uncoupling powershift torque (MLS_ENT) from a dynamic torque (M_DYN) and regulated summation torque (MLS(RE)), the same as from a mass ratio engine/automatic transmission (14) and a factor (13).

9. The method according to claim 3, further comprising the step of determining an uncoupling torque (MK_ENT) of the coupling (2) from a sum of a dynamic engine torque (MDYN_MOT) and a regulated torque (MK(RE)) of the coupling (2), the same as from a mass ratio engine/automatic transmission (8) and a factor (7).

10. The method according to claim 7, further comprising the step of determining a regulated torque (MK(RE)) from a theoretical/actual comparison of the rotational speed difference (dnK_SW, dnK_IST) of the coupling (2) and a driver's performance standard (DKI) via a controller (6).

11. The method according to claim 10, further comprising the step of providing the controller (6) with a limited integrator (31) and feeding, as input variables to the integrator (31), a deviation from the theoretical/actual comparison of the rotational speed difference (dnK_SW, dnK_IST) of the coupling (2), an adjustment speed of the performance standard (DKI) and a ratio actual to theoretical value of the differential rotational speed (dn_IST/dnK_SW) of the coupling (2).

12. The method according to claim 1, further comprising the step of, for the first, second and third operational states, determining the theoretical value of the differential rotational speed (dnK_SW) of the coupling (2) results from the addition of a theoretical value offset (dnLS_SW) and a gear-dependent differential speed (dn_SW(i)) of the coupling (2).

13. The method according to claim 12, further comprising the step of determining the gear-dependent differential rotational speed (dn_SW(i)) for a starting gear of the automatic transmission via a first characteristic field (KF1(i), i=1, 2) wherein the first characteristic field comprises a coordination of the driver's performance standard (DKI) and output rotational speed (nAB) of the coupling (2).

14. The method according to claim 12, further comprising the step of determining the gear-dependent differential rotational speed (dn_SW(i)) for a non-starting gear of the automatic transmission via a second characteristic field (KF(i), 1=3 . . . n), and the second characteristic field comprising a coordination of the driver's performance standard (DKI) and the output rotational speed (nAB) of the coupling (2).

15. The method according to claim 12, further comprising the step of, for the third operational state the theoretical value offset of the differential rotational speed (dnLS_SW) of the coupling (2), during the gear shift under load from a first ratio (i1) to a second ratio (i2) of the automatic transmission (1), increase in the load take-up or gradient adjustment phase and with the termination of the closing phase is again reduced.

16. The method according to claim 12, further comprising the step of reversing, at the end of the gradient adjustment phase, from the first characteristic field (KF1) to the second characteristic field (KF(i)) during the gear shift under load.

17. The method according to claim 14, further comprising the step of, at a vehicle speed (v) lower than a limiting value (GW), increasing a differential rotational speed (dn_SW(i)) of the coupling as protection against stalling via a relevant second characteristic field (KF(i)).

18. The method according to claim 14, further comprising the step of during the second operational state, calculating an increased differential rotational speed (dn_SW(i)) of the coupling, for a vehicle speed (v) lower than a limiting value (GW), as protection against stalling according to the following equation:

$$dn\_SW(i) > NMOT\_MIN - nAB$$

where:

NMOT_MIN: is a minimum rotational speed internal combustion engine; and nAB: is an output rotational speed of the coupling (2).

19. An application of the method for controlling and regulating a coupling according to claim 1 in an automatically power shiftable stepped transmission for a motor vehicle.

20. A method for controlling and regulating a coupling (2) of a motor vehicle transmission in which an electronic control unit determines, via a first regulating circuit (3), a behavior of the coupling (2) during first, second and third operational states wherein the regulated quantity is equivalent to the actual value of a differential rotational speed (dnK_IST) of the coupling (2), the first operational state corresponds to a starting operation, the second operational state to the driving with constant ratio (i=const) and the third operational state exists when an adjustment of the ratio from a first ratio (i1) to a second ratio (i2) of an automatic transmission is initiated, the method comprising the steps of decisively determining the adjustment of the ratio from the first ratio (i1) to the second ratio (i2) of the automatic transmission (1) by a second regulating circuit (4) and interconnecting the first (3) and second (4) regulating circuits with one another via an uncoupling network (7, 8, 13, 14).

21. The application of the method for controlling and regulating a coupling according to claim 20 in an automatic stepped transmission with traction interruption when gear shifting for a motor vehicle.

* * * * *